United States Patent

Iwamura et al.

Patent Number: 5,914,752
Date of Patent: Jun. 22, 1999

[54] BAND-DIVISION SIGNAL PROCESSING SYSTEM

[75] Inventors: Hiroshi Iwamura; Kyoichi Terao; Hidehiro Ishii, all of Tokorozawa, Japan

[73] Assignee: Pioneer Electronic Corporation, Saitama-ken, Japan

[21] Appl. No.: 08/855,211

[22] Filed: May 13, 1997

[30] Foreign Application Priority Data

May 15, 1996 [JP] Japan ..................................... 8-119880

[51] Int. Cl.$^6$ ....................................................... H04N 7/26
[52] U.S. Cl. ........................... 348/427; 348/429; 348/432
[58] Field of Search .................................. 348/422, 429, 348/426, 427, 432, 433; H04N 7/08, 7/26, 7/12, 11/02, 11/04

[56] References Cited

U.S. PATENT DOCUMENTS 5,508,746  4/1996  Lim ......................................... 348/429
5,742,343  4/1998  Haskell .................................... 348/415

*Primary Examiner*—Howard Britton
*Attorney, Agent, or Firm*—Ladas & Parry

[57] ABSTRACT

A band-division signal processing system includes a coding unit and a decoding unit. The coding unit includes: an extracting unit for extracting a part of an original signal to produce a partial band signal; a first quantizer for quantizing the partial band signal to produce a quantized partial band signal; a subtracter for subtracting the quantized partial band signal from the original signal to produce a differential signal; and a first output unit for outputting the partial band signal and the differential signal. The decoding unit includes: a second quantizer having an identical configuration to the first quantizer and for quantizing the partial band signal outputted from the first output unit to produce the quantized partial band signal; an adder for adding the quantized partial band signal produced by the second quantizer to the differential signal outputted from the first output unit to produce the original signal; and a second output unit for outputting the original signal produced by the adder.

10 Claims, 7 Drawing Sheets

$\exp(j\pi n) = (-1)^n$

BAND-DIVISION SIGNAL PROCESSING SYSTEM

BACKGROUND OF THE INVENTION

1. Field of the Invention

The present invention relates to a system which divides a signal such as an audio signal or a video signal into plural frequency bands and applies processing such as transmission or recording/reproduction on the band-division signals.

2. Description of the Prior Art

In the case where the transmission frequency bandwidth is narrower than the bandwidth of the original signal to be transmitted or a hierarchical application is required, the original signal is transmitted or recorded/reproduced after being divided into plural frequency bands. As such a technique, there is known a sub-band coding. FIG. 7 schematically shows the sub-band coding. As shown, an original signal S is divided by a Low Pass Filter (LPF) 1 and a High Pass Filter (HPF) 2 into a low frequency band signal SL and a high frequency band signal SH. Subsequently, the low frequency band signal SL and the high frequency band signal SH are down-sampled by the factor 2 (i.e., by a sampling frequency which is ½ of that of the original signal S) by down-samplers 3 and 4, respectively, so that the total data amount of the two divided signals, i.e., the signals SL and SH, coincides with that of the original signal S. The low frequency band signal SL and the high frequency band signal SH thus obtained are transmitted by the transmission system 5. At the receiving side, up-samplers 6 and 7 up-sample the low frequency band signal SL and the high frequency band signal SH, respectively, to make the sampling frequency of them twice higher, and a LPF 8 and a HPF 9 eliminate aliasing noise. The low frequency signal SL' and the high frequency signal SH' thus obtained are added to each other to obtain a signal S' which is substantially identical to the original signal S. In the case that the system at the receiving side has an ability to reproduce only the low frequency band signal, it may reproduce only the low frequency band signal SL'. Thereby a hierarchical application may be achieved.

In the signal transmission using the band-division technique, there generally are following requirements. First requirement is that the original signal is desired to be completely re-synthesized, i.e., in the case of FIG. 7, the re-synthesized signal S' is completely identical to the signal S. The second requirement is that hierarchical application is ensured, i.e., the subband signal (normally the low frequency band signal) is reproducible independently.

However, in the method described above, the reproduced signal S' is not strictly identical to the original signal S due to the effect of aliasing noise introduced by the down-sampling. To overcome the problem raised by aliasing noise, there is proposed a method of using QMF (Quadrature Mirror Filter). QMF technique attempts to design the filter coefficients so that aliasing noise is canceled at the time of adding the band-divided signals to each other, thereby making it possible to suppress the effect of aliasing noise with the aid of this filter. However, even with the use of QMF, there is required a filter with a certain tap length (i.e., relatively many taps) to eliminate the effect of aliasing noise in a hierarchical application in which only the low frequency band signal is needed to be reproduced. Actually, since the tap length, the coefficient word length and the arithmetic word length are all finite in the hardware and/or software constituting the filter, it is impossible to make the reproduced signal S' completely and strictly identical to the original signal S. In other words, in order to achieve complete re-synthesizing of the original signal, sufficient arithmetic word length is required, and hence data amount to be processed increases considerably. This makes the system configuration complicated and the data amount to be transmitted or recorded may also increase considerably. On the other hand, limiting the operation word length to some extent disables the complete reproduction of the original signal.

In order to achieve complete re-synthesizing of the original signal, there is known another technique using SSKF (Symmetric Short Kernel Filter), which includes short tap-length analysis synthesizing filter.

However, in this case, the frequency characteristic of the filter is not very steep due to its short tap-length, and hence aliasing noise by the downsampling increases. Therefore, this technique is not applicable to a hierarchical system which needs the reproduction of only the low frequency band signal.

SUMMARY OF THE INVENTION

It is an object of the present invention to provide a band-division signal processing system capable of achieving complete re-synthesizing of the original signal and hierarchical application, in the case of signal processing of frequency-band divided signals, without the increase of data amount to be processed.

According to one aspect of the present invention, there is provided a band-division signal processing system including a coding unit and a decoding unit, the coding unit including: an extracting unit for extracting a part of an original signal to produce a partial band signal; a first quantizer for quantizing the partial band signal to produce a quantized partial band signal; a subtracter for subtracting the quantized partial band signal from the original signal to produce a differential signal; and a first output unit for outputting the partial band signal and the differential signal, the decoding unit including: a second quantizer identical to the first quantizer and for quantizing the partial band signal outputted from the first output unit to produce the quantized partial band signal; an adder for adding the quantized partial band signal produced by the second quantizer to the differential signal outputted from the first output unit to produce the original signal; and a second output unit for outputting the original signal produced by the adder.

In accordance with the system thus configured, in the coding unit, the extracting unit extracts a part of an original signal to produce a partial band signal, and the first quantizer quantizes the partial band signal to produce a quantized partial band signal. The subtracter subtracts the quantized partial band signal from the original signal to produce a differential signal. The first output unit outputs the partial band signal and the differential signal, which are supplied to the decoding unit via a recording/reproducing system or a transmission system. In the decoding unit, the second quantizer has an identical configuration to the first quantizer and quantizes the partial band signal outputted from the first output unit to produce the quantized partial band signal. The adder adds the quantized partial band signal produced by the second quantizer to the differential signal outputted from the first output unit to produce the original signal. The second output unit for outputting the original signal produced by the adder.

The coding unit may further include: a first sampling unit for sampling the partial band signal with a first sampling frequency which is 1/n times larger than a sampling frequency of the original signal to produce a first sampled signal and for supplying the first sampled signal to the first quantizer; a second sampling unit for sampling the partial band signal with a second sampling frequency which is n times larger than the first sampling frequency to output a second sampled signal; and a first band limiting unit for band-limiting the second sampled signal to output a first band-limited signal to the first quantizer, and the decoding unit may further include: a third sampling unit for sampling the partial band signal outputted by the first output unit with the second sampling frequency to produce a third sampled signal; and a second band-limiting unit for band-limiting the third sampled signal to output a second band-limited signal to the second quantizer.

Further, the coding unit may further include a coder for coding the differential signal to output a coded differential signal to the first output unit, and the decoding unit may further include a decoder for decoding the differential signal outputted by the first output unit to output a decoded differential signal and supplying the decoded differential signal to the adder. Still further, the second output unit may include unit for outputting the partial band signal outputted by the first output unit.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

Figure 1:
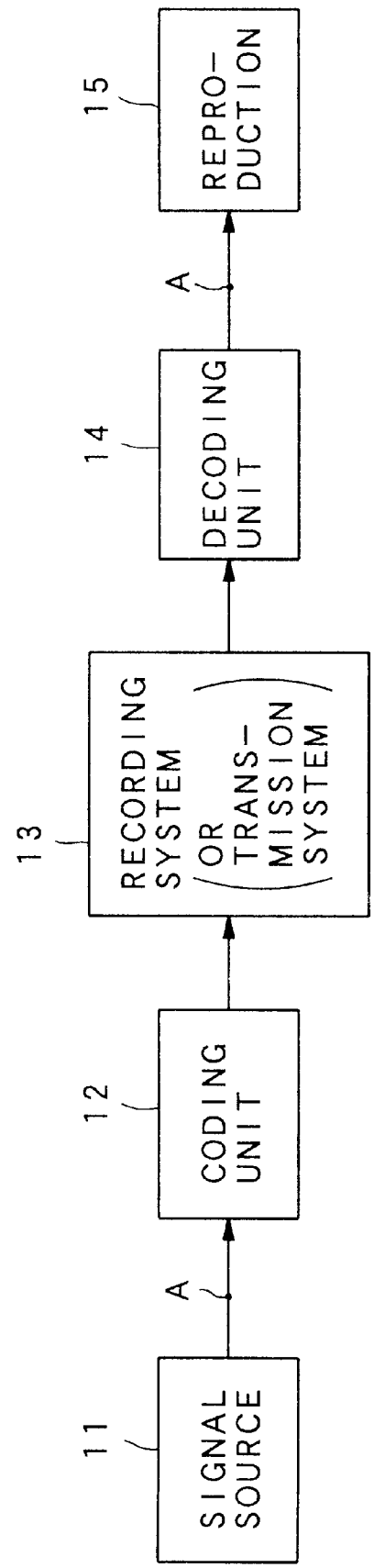
FIG. 1 is a block diagram illustrating a configuration of a band-division signal processing system according to an embodiment of the present invention.

FIG. 1 shows a whole configuration of a band-division signal processing system according to an embodiment of the present invention. As shown, first in this system, a signal A such as an audio signal and/or a video signal to be processed is supplied from a signal source 11 to a coding unit 12. The signal A is subjected to a frequency band division and a necessary coding by the coding unit 12, and is supplied to a recording system (or a transmission system) 13. While the processing performed in the coding unit 12 constitutes a major characteristic part of the present invention, the detail of which will be described later. The recording system 13 may be an information recording and reproducing system using an optical disk, or a signal transmission system using a transmission line, for example. The output of the recording system 13 is supplied to a decoding unit 14 to perform decoding. The decoding technique by the decoding unit 14 depends on the coding technique by the coding unit 12, and hence the detail of the decoding will also be described later. The signal A decoded by the decoding unit 14 is supplied to a reproduction unit 15 which reproduces the supplied signal A. The reproduction unit 15 is a unit including an amplifier, speakers, etc. in the case where the signal A is an audio signal, and is a unit including a display device in the case where the signal A is a video signal.

Figure 2:
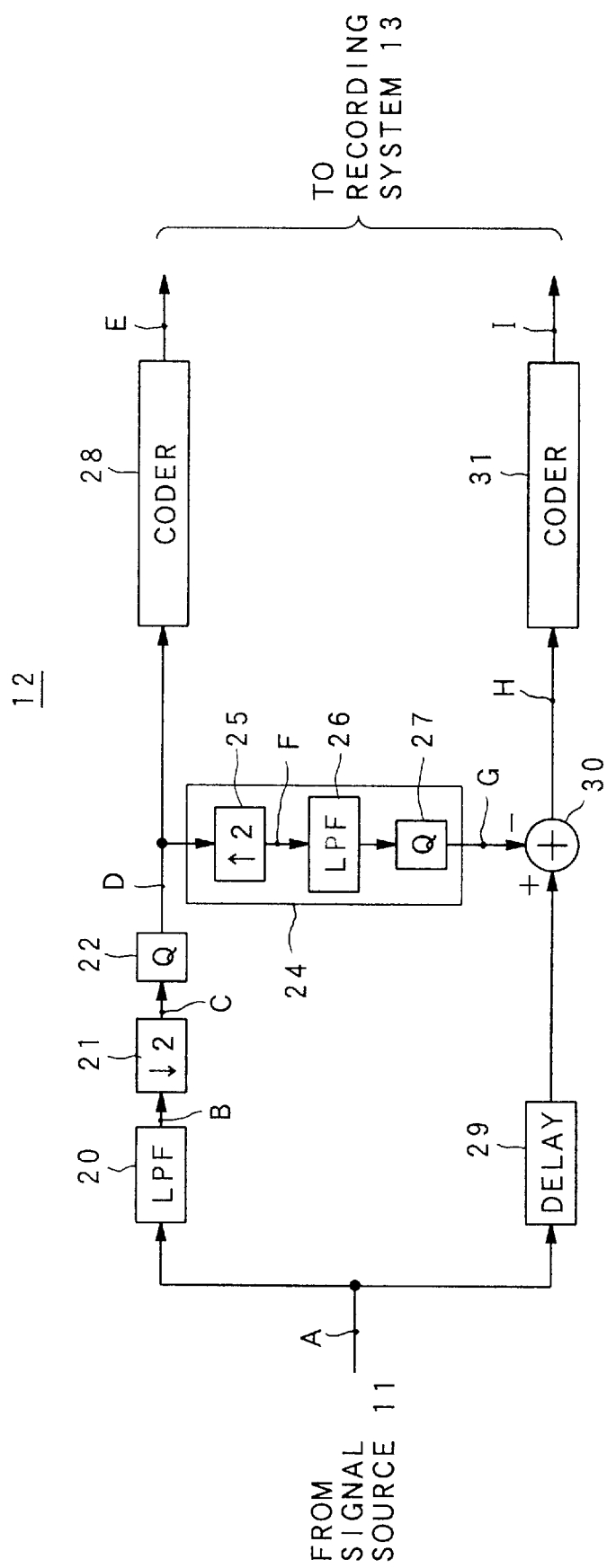
FIG. 2 is a block diagram illustrating a configuration of the coding unit shown in FIG. 1.

Next, the configuration of the coding unit 12 will be described by referring to FIGS. 2. FIG. 2 shows the configuration of the coding unit 12. As illustrated, the coding unit 12 includes Low Pass Filters (LPF) 20 and 26, a down-sampler 21, quantizers 22 and 27, an up-sampler 25, a delay 29, an adder 30, and coders 28 and 31. The up-sampler 25, the LPF 26 and the quantizer 27 together constitute a re-quantizing unit 24.

Next, the outline of the signal processing by the coding unit 12 will be described. The signal A supplied from the signal source 11 (hereinafter referred to as "an original signal A") is divided into two processing paths. Namely, a low frequency band signal D is generated by the processing path including the LPF 20, the down-sampler 21 and the quantizer 22, and is supplied to the coder 28. The re-quantizing unit 24 generates a re-quantized low frequency band signal G from the output of the quantizer 22, and supplies it to the adder 30. The adder 30 subtracts the re-quantized low frequency band signal G from the original signal A, and supplies a resultant differential signal H to the coder 31. The coders 28 and 31 code the low frequency band signal D and the differential signal H, respectively, by the coding systems described later, and supplies the resultant coded signals E and I to the recording system 13. By the above processing, the coding unit 12 generates the low frequency band signal D of the original signal A, and the differential signal H of the original signal A and the low frequency band signal, and supplies them to the recording system 13 as the signals E and I after applying necessary coding.

Figure 4A:
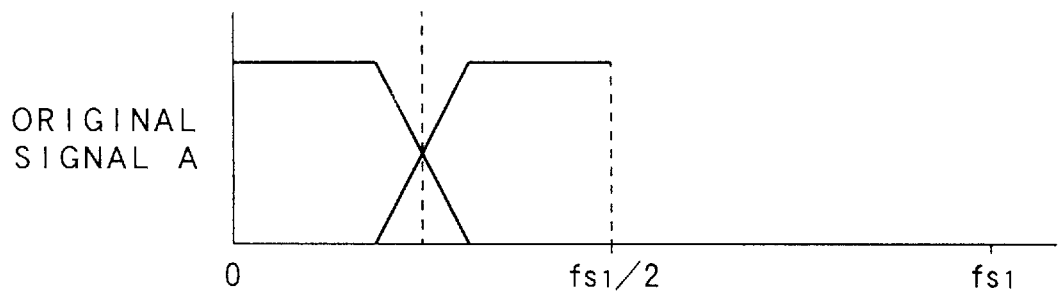
FIGS. 4A to 4C are diagrams illustrating characteristics of the signals appearing in the coding unit and the decoding unit.
Figure 4B:
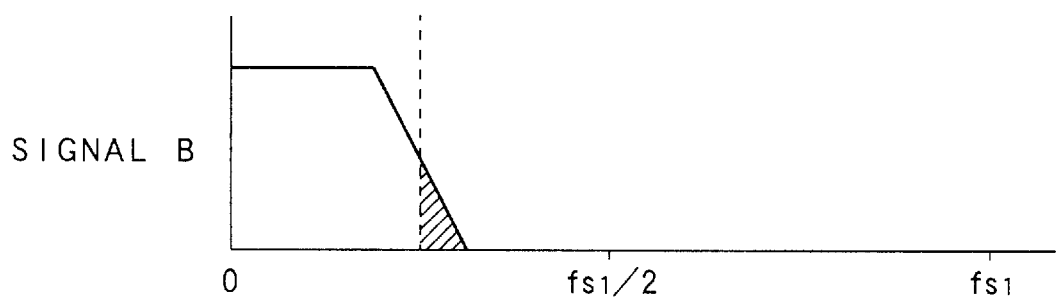
Figure 4C:
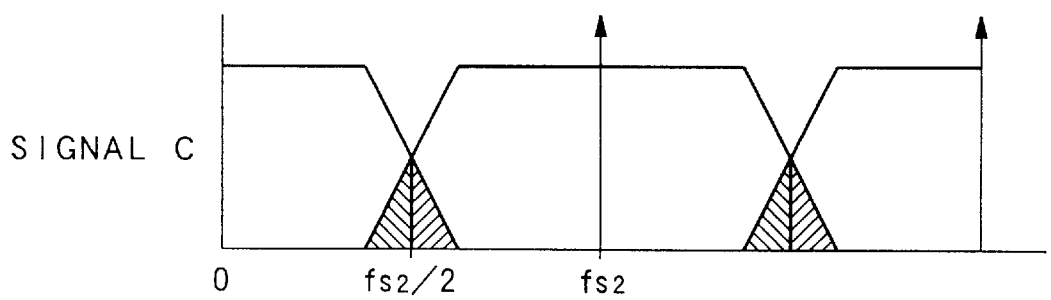

Next, the signal processing at every parts of the system will be described in more detail with reference to FIGS. 4A to 4C and 5A to 5B which show frequency characteristics of the respective signals obtained in the coding unit 12. It is assumed that the original signal A is a signal sampled by the sampling frequency $fs_1$, as shown in FIG. 4A, i.e., a signal band-limited to $fs_1/2$. The original signal A is band-limited by the LPF 20 to the frequency band of $fs_1/4$ so as to diminish the aliasing noise generated by the downsampler 21 at the subsequent stage. The signal B thus band-limited has the frequency characteristic as shown in FIG. 4B. Then, the signal B is downsampled by the down-sampler 21. Namely, the signal B is sampled by the sampling signal $fs_2$ which is ½ of the sampling frequency $fs_1$ of the original signal A. By this, aliasing noise component is generated at both higher and lower sides of the frequency $fs_2/2$, and the signal C obtained by the down-sampling has the frequency characteristic as shown in FIG. 4C. The signal C is quantized by the quantizer 22 and supplied to the coder 28 as the low frequency band signal D. The coder 28 codes the low frequency band signal D according to a predetermined coding system to output the coded signal as the low frequency band signal E. The coding system of the coder 28, which depends upon the nature of the original signal A, may generally be a coding system for reducing the data quantity, for example, a combination of a predictive coding system such as ADPCM and an entropy coding system such as Huffman coding system.

Figure 5A:
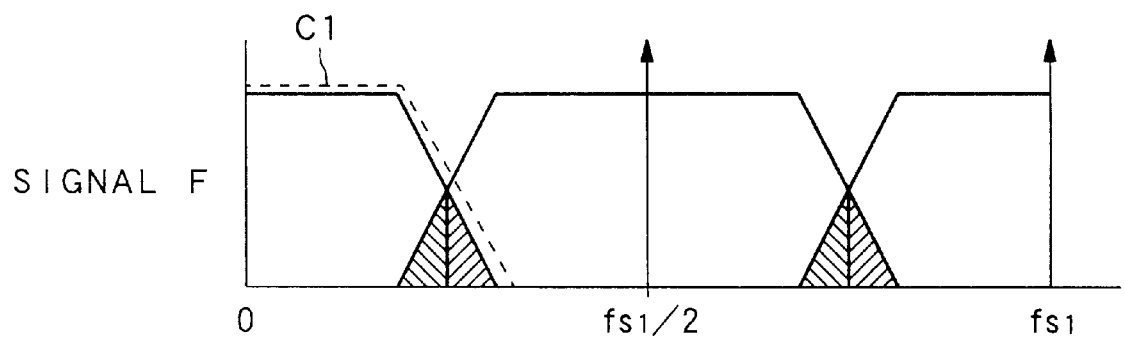
FIGS. 5A and 5B are other diagrams illustrating characteristics of the signals appearing in the coding unit and the decoding unit.
Figure 5B:
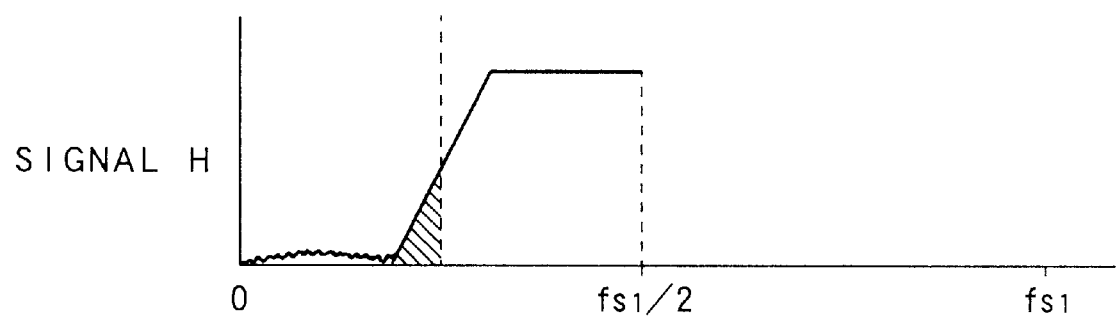

The low frequency band signal D is also supplied to the re-quantizing unit 24. The up-sampler 25 in the re-quantizing unit 24 up-samples the low frequency band signal D by the factor 2 to make its sampling frequency twice higher. Namely, the up-sampler 25 samples the low frequency band signal D by the sampling frequency $fs_1$. The low frequency band signal F generated by the up-sampling has the frequency characteristic as shown in FIG. 5A. Namely, the low frequency band signal F has identical frequency characteristic to the low frequency band signal C, but its sampling frequency is doubled. The up-sampler 25 is provided for the purpose of making the sampling frequency of the low frequency band signal G equal to the sampling frequency of the original signal A to enable the subtraction of the low frequency band signal G from the original signal A by the adder 30. Subsequently, the low frequency band signal F is band-limited to the frequency band of $fs_1/4$ by the LPF 26 to eliminate the aliasing noise component. The LPF 26 has a filtration characteristic as shown by the broken line C1 in FIG. 5A. Subsequently, the low frequency band signal F thus band-limited is re-quantized by the quantizer 27. This re-quantization limits the bit number of the low frequency band signal F. Since the bit number of the low frequency band signal F has increased due to the upsampling by the up-sampler 25 and the band-limiting by the LPF 26, it is required an arithmetic operation over considerable bit numbers if the signal F is subtracted from the original signal A in this state. Therefore, the output of the LPF 26 is quantized (re-quantization) by a quantizer 27 having a predetermined bit number to reduce the bit number of the low frequency band signal F, which has increased due to the filtering. Namely, the bit number is limited to the quantization bit number of the quantizer 27. As a result, the low frequency band signal G, which bit number is thus limited, has the frequency characteristic substantially identical to that of the low frequency band signal B shown in FIG. 4B. In this way, the signal G equivalent to the low frequency band signal B can be obtained without increasing its bit number. Actually, the quantization by the quantizer 27 results quantization noise as shown in FIG. 5B (see. the low frequency band area). However, since the decoding unit 14 produces the low frequency band signal G by the quantization unit 39 identical to the re-quantization unit 24 in the coding unit 12, i.e., since the decoding unit 14 produces the low frequency band signal G including identical quantization noise and it is added to the differential signal I to produce the original signal A, the original signal A can be completely re-synthesized even though the differential signal H includes the quantization noise introduced by the quantizer 27.

Starting from the concept of generating the differential signal of the original signal and the low frequency band signal, it is conceivable to subtract the low frequency band signal B, which is band-limited by the LPF 20, from the original signal A. However, in that case also, the bit number of the low frequency band signal B is increased due to the filtering by the LPF 20. Therefore, the attempt of simply subtracting the low frequency band signal B from the original signal A to produce the differential signal requires arithmetic operation of considerable bit numbers and thereby the quantity of the resultant data considerably increases. While it may be possible if the bit number of the original signal is relatively small, it is impossible in practical sense to produce the differential signal by subtracting the low frequency band signal B outputted by the LPF 20 from the original signal A in the case that the original signal A has relatively large bit number such as 20 bits, 24 bits, and so on. In this view, the system of the present invention up-samples the low frequency band signal D, band-limits it to generate the low frequency band signal equivalent to the low frequency band signal B, and then quantizes it to limit the bit number thereof. By this, the effect by the quantization error may be eliminated at the decoding unit side as described above. It is noted that the order of the down sampler 21 and the quantizer 22 in FIG. 2 may be reversed. Also, the quantizer 22 may have the quantization bit number different from that of the quantizer 27.

On the other hand, the original signal A is also supplied to the delay 29. The delay 29 has the role of adjusting the timing of the low frequency band signal G operated by the adder 30 to be coincident with timing of the original signal A on the time basis. Hence, the delay amount of the delay 29 corresponds to the time in which the low frequency band signal G is generated from the original signal A by the processing path of the LPF 20, the downsampler 21, the qunatizer 22 and the re-quantization unit 24. The adder 30 subtracts the low frequency band signal G from the original signal A to produce the differential signal H at the timing thus adjusted by the delay 29. The differential signal H has the frequency characteristic as shown in FIG. 5B. Namely, as a result of subtracting the frequency band of the low frequency band signal B from the frequency band of the original signal A, only the high frequency band component remains. The differential signal H is supplied to the coder 31 which performs the predetermined coding and supplies the coded signal to the recording system 13 as the differential signal I. The configuration of the coder 31 is determined dependently upon the nature of the original signal A, similarly to the coder 28. The application and/or modification of the coder 31 will be described later. As described above, since the differential signal H of the original signal A and the low frequency band signal G is supplied to the decoding unit 14 via the recording system 13 and the decoding unit 14 generates the low frequency band signal G to re-synthesize the original signal A, the decoding unit 14 can completely re-synthesize the original signal A even if the quantization is made by the quantizer 27.

Figure 3:
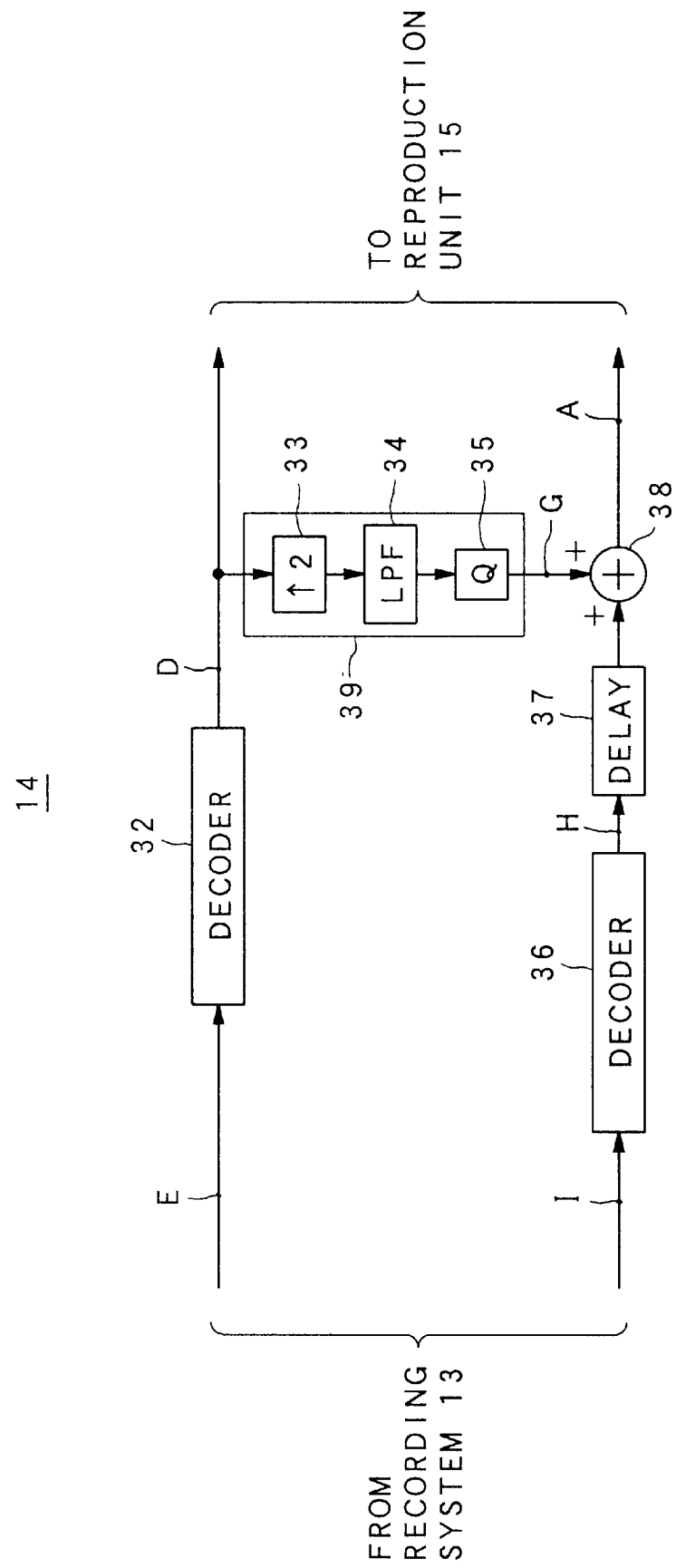
FIG. 3 is a block diagram illustrating a configuration of the decoding unit shown in FIG. 1.

Next, the configuration and operation of the decoding unit 14 will be described. FIG. 3 shows the configuration of the decoding unit 14. As shown, the decoding unit 14 includes decoders 32 and 36, an up-sampler 33, a LPF 34, a quantizer 35, a delay 37 and an adder 38.

The decoder 32 receives the low frequency band signal E from the recording system 13 and decodes it to generate the low frequency band signal D, which is directly supplied to the reproduction unit 15. Therefore, the reproduction unit 15 can reproduce only the low frequency band signal D, if desired. According to demand, the reproduction unit 15 may be configured to reproduce the low frequency band signal D after applying a filtering on the signal D to eliminate the aliasing noise included therein.

The low frequency band signal D is also supplied to the re-quantization unit 39 which has an identical configuration to the re-quantization unit 24 in the coding unit 12. Namely, the up-sampler 33, the LPF 34 and the quantizer 35 are identical to the up-sampler 25, the LPF 26 and the quantizer 27, respectively. Therefore, the re-quantization unit 39 up-samples the low frequency band signal D by the up-sampler 33, band-limits it by the LPF 34 and then quantizes it by the quantizer 35 to generate the low frequency band signal G. By making the re-quantization unit 39 in the decoding unit 14 identical to the re-quantization unit 24 in the coding unit 12, i.e., making the quantizer 35 identical to the quantizer 27, if the quantizer 27 in the coding unit 12 introduces quantization noise, the decoding unit 14 generates the low frequency band signal G including the same quantization noise and adds it to the differential signal H. Therefore, the original signal A may be completely re-synthesized without suffering the effect of quantization noise introduced by the quantizer 27.

The differential signal I outputted from the recording system 13 is decoded by the decoder 36 to be the differential signal H. The delay 37 is employed to adjust the timing, on the time basis, of adding the low frequency band signal G and the differential signal H at the adder 30, and the delay amount of the delay 37 is determined in consideration of the required processing time by the decoder 32 and re-quantization unit 39, the output timing shift of the low frequency band signal E and the differential signal I outputted by the recording system 13, etc. The adder 30 adds the low frequency band signal G and the differential signal H to synthesize the original signal A and supplies it to the reproduction unit 15. Therefore, the reproduction unit 15 may reproduce only the low frequency signal from the low frequency band signal D or reproduce a broad-band signal from the original signal A, thereby enabling hierarchical application.

As described above, according to the band-division signal processing system of the present invention, the coding unit side supplies, to the recording system, the low frequency signal obtained by the band-division, and the differential signal of the original signal and the low frequency band signal. The decoding unit side produces the original signal from the low frequency band signal and the differential signal. Therefore, the reproduction unit can reproduce the low frequency band signal if it has a capability of reproducing only the low frequency band signal. On the other hand, if the reproduction unit has a capability of reproducing broad band signal, it can re-synthesize the original signal from the low frequency band signal and the differential signal and reproduce it. In this way, the hierarchical application can be achieved. Further, since the original signal is synthesized from the low frequency band signal and the differential signal, the original signal may be reproduced with high-fidelity. Still further, the low frequency signal is quantized and then it is subtracted from the original signal at the time of generating the differential signal, and the decoding unit side generates the low frequency band signal by the quantizer of identical characteristic. Hence, the quantization error included in the quantized low frequency band signal do no harm on the synthesizing of the original signal, thereby enabling the complete re-synthesizing of the original signal.

Next, the coding system in the coding unit 12 will be described. In the present invention, there is no limitation on the coding system of the coders 28 and 31, and they may employ any arbitrary coding system which is suitable for and in conformity with the nature of the original signal to be processed. In the case that the recording capacity of the recording system is sufficiently large, even the compression by the coding may be omitted. The coding unit 12 shown in FIG. 2 down-samples the low frequency band signal using the down-sampler 21. Since the differential signal has the same data amount as the original signal, the total data amount is the sum of the low frequency band signal and the differential signal, and hence the signal 1.5 times larger than that of the original signal is supplied to the recording system 13. In this view, if the recording system 13 has a limitation on its recording capacity, it is preferred that both of the low frequency band signal and the differential signal are compressed before being supplied to the recording system 13.

Figure 6A:
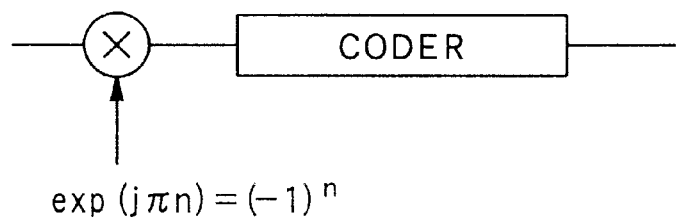
FIGS. 6A to 6C are diagrams illustrating modifications of the coding unit.
Figure 6B:
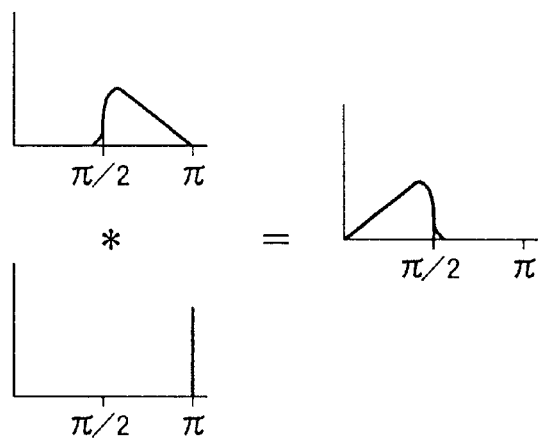
Figure 6C:
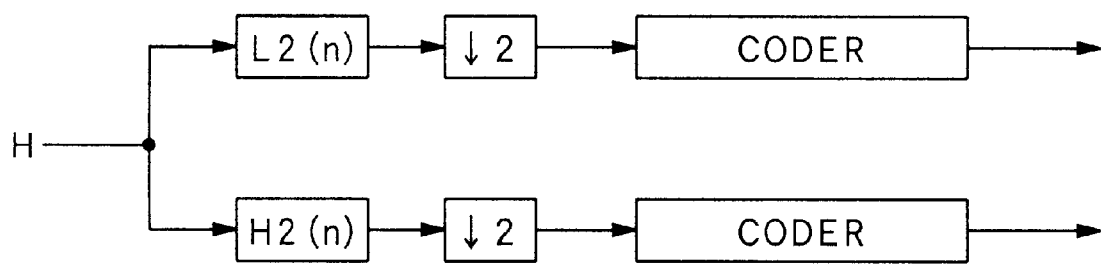
Figure 7:
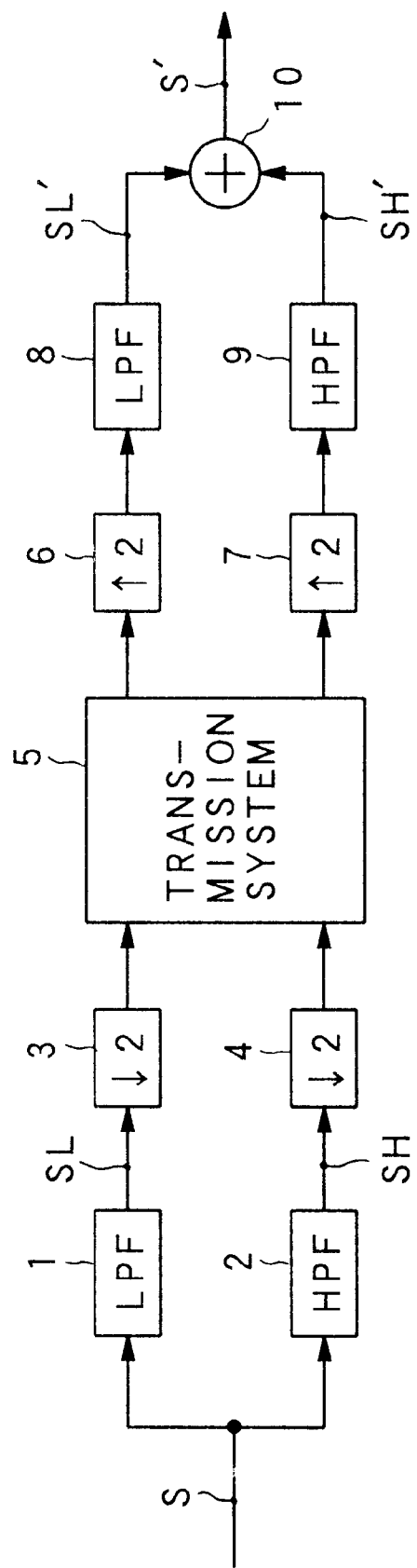
FIG. 7 is a block diagram schematically illustrating a band-division signal processing utilizing sub-band coding.

As for the coding technique, a predictive coding and an entropy coding may be used for data compression in the case of audio signal. Particularly, with respect to the coder 31, the following application may be achieved. As seen in FIG. 5B, the differential signal H supplied to the coder 31 has such a peculiar characteristic that its power is well concentrated at the high frequency band. If the original signal is an audio or a video signal, its high frequency component generally has less power than its low frequency component. Therefore, the differential signal H generally has a characteristic that the power decreases as the frequency increases as shown in FIG. 6B (the chart at up and left side). In such a case, as shown in FIG. 6A, the high frequency component and low frequency component (with the border frequency $\pi/2$) of the differential signal H may be reversed at every samples before the compression by the coding, thereby enabling efficient data compression. As another method, the differential signal H may be divided into high and low frequency bands, as shown in FIG. 6C, to make the coding separately. This also enables efficient compression. In FIG. 6C, the divided signal is down sampled after the band division for the purpose of making the total data amount of the signals after the band division to be identical to the data amount before the band division.

The above description is directed to the use of a reversible coding system. However, by use of a coding system, which permits a signal quality degradation for some extent, for the coding of the differential signal, the data amount of high frequency band signal, relatively unperceivable by human being, may be effectively reduced without deteriorating the quality of low frequency band signal. Thereby the reduction of data may be possible with suppressing the degradation of signal quality.

The invention may be embodied in other specific forms without departing from the spirit and essential characteristics thereof. The present embodiment is therefore to be considered in all respects as illustrative and not restrictive, the scope of the invention being indicated by the appended claims rather than by the foregoing description and all changes which come within the meaning and range of equivalency of the claims arc therefore embraced therein.

What is claimed is:

1. A band-division signal processing system comprising a coding unit and a decoding unit, said coding unit comprising:

an original signal band limiting means for band-limiting an original signal to produce a partial band signal;

a first quantizer for quantizing the partial band signal to produce a quantized partial band signal;

a subtracter for subtracting the quantized partial band signal from the original signal to produce a differential signal; and a first output means for outputting the partial band signal and the differential signal, said decoding unit comprising:

a second quantizer identical to said first quantizer and for quantizing the partial band signal outputted from said first output means to produce the quantized partial band signal;

an adder for adding the quantized partial band signal produced by said second quantizer to the differential signal outputted from said first output means to produce said original signal; and a second output means for outputting the original signal produced by said adder.

2. A system according to claim 1, wherein said coding unit further comprises:

a first sampling means for sampling the partial band signal with a first sampling frequency which is 1/n times larger than a sampling frequency of the original signal to produce a first sampled signal;

a second sampling means for sampling the first sampled signal with a second sampling frequency which is n times larger than said first sampling frequency to output a second sampled signal; and a first band limiting means for band-limiting the second sampled signal to output a first band-limited signal to said first quantizer, and said decoding unit further comprises:

a third sampling means for sampling the partial band signal outputted by said first output means with the second sampling frequency to produce a third sampled signal; and a second band-limiting means for band-limiting the third sampled signal to output a second band-limited signal to said second quantizer.

3. A system according to claim 1, wherein said coding unit further comprises a coder for coding the differential signal to output a coded differential signal to said first output means, and said decoding unit further comprises a decoder for decoding the differential signal outputted by said first output means to output a decoded differential signal and supplying the decoded differential signal to said adder.

4. A system according to claim 1, wherein said second output means comprises means for outputting the partial band signal outputted by said first output means.

5. A coding device for use in combination with a decoding device in a band-division signal processing system, comprising:

an original signal band limiting means for band-limiting an original signal to produce a partial band signal;

a first quantizer for quantizing the partial band signal to produce a quantized partial band signal;

a subtracter for subtracting the quantized partial band signal from the original signal to produce a differential signal; and a first output means for outputting the partial band signal and the differential signal.

6. A coding device according to claim 5, further comprising:

a first sampling means for sampling the partial band signal with a first sampling frequency which is 1/n times larger than a sampling frequency of the original signal to produce a first sampled signal;

a second sampling means for sampling the first sampled signal with a second sampling frequency which is n times larger than said first sampling frequency to output a second sampled signal; and a first band limiting means for band-limiting the second sampled signal to output a first band-limited signal to said first quantizer.

7. A coding device according to claim 5, further comprising a coder for coding the differential signal to output a coded differential signal to said first output means.

8. A decoding device for use in a band-division signal processing system in combination with a coding device comprising: an original signal band limiting means for band-limiting an original signal to produce a partial band signal; a first quantizer for quantizing the partial band signal to produce a quantized partial band signal; a subtracter for subtracting the quantized partial band signal from the original signal to produce a differential signal; and a first output means for outputting the partial band signal and the differential signal, said decoding device comprising:

a second quantizer identical to said first quantizer and for quantizing the partial band signal outputted from said first output means to produce the quantized partial band signal;

an adder for adding the quantized partial band signal produced by said second quantizer to the differential signal outputted from said first output means to produce said original signal; and a second output means for outputting the original signal produced by said adder.

9. A decoding device according to claim 8, wherein said coding device further comprises: a first sampling means for sampling the partial band signal with a first sampling frequency which is 1/n times larger than a sampling frequency of the original signal to produce a first sampled signal; a second sampling means for sampling the first sampled signal with a second sampling frequency which is n times larger than said first sampling frequency to output a second sampled signal; and a first band limiting means for bandlimiting the second sampled signal to output a first band-limited signal to said first quantizer, said decoding device further comprising:

a third sampling means for sampling the partial band signal outputted by said first output means with the second sampling frequency to produce a third sampled signal; and a second band-limiting means for band-limiting the third sampled signal to output a second band-limited signal to said second quantizer.

10. A decoding device according to claim 8, wherein said coding device further comprises a coder for coding the differential signal to output a coded differential signal to said first output means, said decoding unit further comprising a decoder for decoding the differential signal outputted by said first output means to output a decoded differential signal and supplying the decoded differential signal to said adder.

* * * * *